United States Patent
Bacchus et al.

(10) Patent No.: US 7,219,223 B1
(45) Date of Patent: May 15, 2007

(54) METHOD AND APPARATUS FOR PROVIDING DATA FROM A SERVICE TO A CLIENT BASED ON ENCRYPTION CAPABILITIES OF THE CLIENT

(75) Inventors: Shaheed Bacchus, Athens, GA (US); Bradley Dale Dike, Marietta, GA (US); Bruce Wong, Athens, GA (US); Edward Curt Kersey, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 765 days.

(21) Appl. No.: 10/071,455

(22) Filed: Feb. 8, 2002

(51) Int. Cl.
*H04L 9/00* (2006.01)

(52) U.S. Cl. .................................... 713/150
(58) Field of Classification Search ............... 726/1, 726/22, 26; 713/150, 182; 380/255, 277; 705/80, 64
See application file for complete search history.

(56) References Cited

U.S. PATENT DOCUMENTS

| 2002/0012433 A1 | 1/2002 | Haverinen et al. | |
| 2002/0103663 A1* | 8/2002 | Bankier et al. | 705/1 |
| 2003/0046532 A1* | 3/2003 | Gast | 713/151 |

OTHER PUBLICATIONS

"Cryptography and Network Security, Principles and Practice", Stallings, Chapter 14, "Web Security".*
"Introduction to TLS," Netscape Communications Corp., http://developer.netscape.com/docs/manuals/security/sslin/contents.htm, 1998.
E. Rescorla, "HTTP Over TLS," IETF RFC 2818, May 2000.
R. Khare et al., "Upgrading to TLS Within HTTP/1.1," IETF RFC 2817, May 2000.
A. Medvinsky et al., "Addition of Kerberos Cipher Suites to Transport Layer Security (TLS)," IETF RFC 2712, Oct. 1999.
T. Dierks et al., "The TLS Protocol Version 1.0," IETF RFC 2246, Jan. 1999.
"Simple Object Access Protocol Version 1.1," http://w3.org/tr/soap/ Simple Object Access Protocol 1 1.htm, W3 Consortium, May 8, 2000.
"XML Envelope Schema," http://schemas.xmlsoap.org/soap/envelope, W3 Consortium, 2001.
Bersani, F., et al., "Deploying new Wireless Standards in Corporate Environments", France Telecom R&D, Apr. 2004, entire document, http://www.first.org/conference/2004/papers/c09.pdf.

* cited by examiner

*Primary Examiner*—Kambiz Zand
*Assistant Examiner*—Thomas Ho
(74) *Attorney, Agent, or Firm*—Hickman Palermo Truong & Becker LLP

(57) ABSTRACT

A method and apparatus are disclosed for providing data from a service to a client based on the encryption capabilities of the client. Cipher suite lists are exchanged between a client and an endpoint. On the endpoint, the cipher suite list incorporates a mapping of cipher suite names to services. The endpoint uses the client's list of cipher suites in conjunction with the mapping of cipher suite names to services to determine a cipher suite match. A service is selected based on the cipher suite match. A server farm is selected based on the service. The client is informed of this cipher suite match and the endpoint retains knowledge of the cipher suite match throughout the session. Therefore, the encrypted connection between the client and the endpoint can be disconnected and later reestablished to provide data from the particular server.

38 Claims, 7 Drawing Sheets

METHOD AND APPARATUS FOR PROVIDING DATA FROM A SERVICE TO A CLIENT BASED ON ENCRYPTION CAPABILITIES OF THE CLIENT

FIELD OF THE INVENTION

The present invention generally relates to providing data from a server to a client. The invention relates more specifically to a method and apparatus for providing data from a service to a client based on encryption capabilities of the client.

BACKGROUND OF THE INVENTION

As more people are turning to the Internet for services such as banking and shopping, there is a growing need for transmitting data securely. Various computer-based approaches have been developed to facilitate secure or encrypted delivery of data from a content server to a client associated with the end user. Several technical issues arise in the course of implementing these approaches. For example, the time it takes to provide the data to people securely is a factor in selecting an approach. Another problem is determining what level of service can be provided to people based on their particular security capabilities.

One past approach is the Secure Sockets Layer (SSL) protocol, now known as TLS. SSL is the most common mechanism on the Internet for facilitating the secure transport of data. In operation, the SSL protocol involves two processing phases. First, there is a key exchange or "handshake" phase, in which the server and client attempt to agree upon an encryption suite to be used for data transmission. After the key exchange or "handshake" is negotiated, a bulk encryption or data transmission phase is carried out in which the desired content is transmitted using the agreed-upon encryption suite.

Both phases may be executed using any of several sets of cryptographic methods. Each set of cryptographic method is termed a cipher suite; a cipher suite is an association of a key exchange mechanism for use in the handshake phase and a bulk encryption mechanism for use in the data transmission phase. For instance, the cipher suite TLS_RSA_WITH_RC4_128_SHA specifies the TLS protocol (SSL v3.1) using the RSA algorithm for key exchange, 128-bit RC4 for bulk encryption, and the SHA message digest algorithm. Similarly, the cipher suite TLS_RSA_EXPORT_WITH_RC4_40_MD5 specifies the TLS protocol using RSA_EXPORT for key exchange, 40-bit RC4 for bulk encryption and MD5 digest algorithm. The first cipher suite provides stronger encryption since it uses larger key lengths. The second cipher suite was designed to comply with certain United States export laws that restrict use of strong cryptography for transmissions outside of the United States.

Thus, different cipher suites may provide different levels of encryption capabilities. Not all servers can support all cipher suites. Similarly, not all clients can use all cipher suites. The handshake phase of SSL is used to negotiate a compatible cipher suite.

In another past approach, server farms are used in conjunction with SSL to serve content to clients. A server farm is a set of content servers that are associated in some way; for example, all the servers are typically commonly owned and operated, or geographically co-located, or protected by a common firewall, or use a single virtual network address.

Each server in a server farm may contain different types of data that have different levels of security. An owner, operator or administrator of the server farm may wish to deliver content from various servers only to clients or users that can use appropriate cipher suites. For example, an administrator may want to allow all SSL users, regardless of their encryption capabilities, to have access to non-confidential data, but may wish to restrict certain users, who have limited encryption capabilities, from accessing highly confidential data. For example, a bank may allow all users to view their respective account information, but may allow only users with higher encryption capabilities to modify the contents of their respective accounts.

In one approach for using a server farm in conjunction with SSL, a Web server in the server farm terminates the SSL connection, and a custom application on the Web server determines if the client is using an appropriate encryption level. There are drawbacks to this method, however. SSL is computationally expensive. The number of SSL transactions that most Web servers can process concurrently is a small fraction of the number of non-SSL connections that the Web servers can process. As a result, major SSL content providers have been turning to dedicated SSL termination devices, which are exclusively responsible for processing SSL connections directed to particular content servers. Examples of SSL termination devices include products available from Alteon, Sonicwall, and others.

However, in this arrangement, since the SSL termination device processes SSL connection, the Web server does not store information identifying the cipher suite that is negotiated between the SSL termination device and the client. Furthermore, known SSL termination devices do not provide means for delivering different content based on the client's encryption capabilities. Therefore, at present there is no way to deliver content from a particular server of a server farm to a client based on the cipher suite or encryption capabilities available at the client.

Based on the foregoing, there is a clear need for a mechanism to route data from a service to a client based on the encryption capabilities of the client.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for providing data from a service to a client based on encryption capabilities of the client.

According to one feature, a cipher suite that is compatible with both a client and an endpoint is determined, which is hereinafter referred to as a cipher suite match. In one approach for making a cipher suite match, cipher suite lists are exchanged between a client and an endpoint. An endpoint is a server farm, server, or other source of content, data, or services that are useful to the client. The cipher suite lists are prioritized lists of the cipher suites that are available to the client and the endpoint. On the endpoint, the cipher suite list incorporates a mapping of cipher suite names to services. The endpoint uses the client's list of cipher suites in conjunction with the mapping of cipher suite names to services to determine a cipher suite match.

In another feature, the first common cipher suite in both lists is designated as the cipher suite match. The client is informed of the cipher suite match, and the endpoint retains knowledge of the cipher suite match throughout the session.

In another feature, a service is selected based on the cipher suite match; a server farm is selected based on the service; and a particular server is selected from the server farm. The encrypted connection between the client and the endpoint can be disconnected while the endpoint communicates with a particular server in a server farm. The cipher suite match can be used to establish future communications between the client and the endpoint. During the communication, the endpoint among other things can either retrieve the requested data or instruct the particular server to route the requested data to the client.

In other aspects, the invention encompasses a computer apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing data from a service to a client based on encryption capabilities of the client is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 TECHNICAL OVERVIEW
2.0 METHOD FOR PROVIDING DATA BASED ON ENCRYPTION CAPABILITIES
3.0 IMPLEMENTATION MECHANISMS—HARDWARE OVERVIEW
4.0 EXTENSIONS AND ALTERNATIVES 1.0 TECHNICAL OVERVIEW

Figure 1:
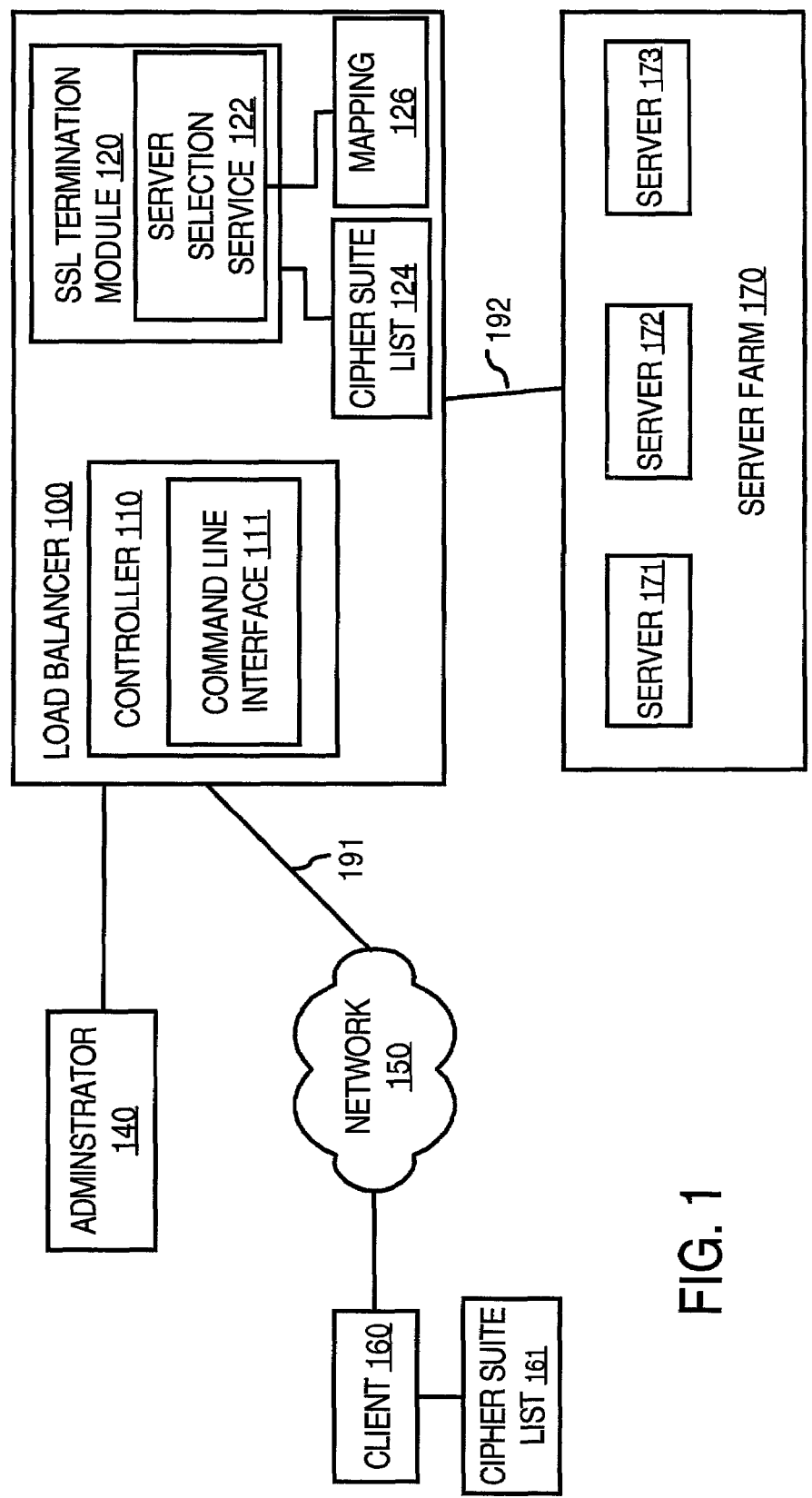
FIG. 1 is a block diagram that illustrates an overview of a system used with one embodiment of the method for providing data from a service to a client based on encryption capabilities of the client.

FIG. 1 is a block diagram that illustrates an overview of a system used with one embodiment of the method for providing data from a service to a client based on encryption capabilities of the client.

A client 160 is communicatively coupled, directly or indirectly through a network 150, to a load balancer 100. Client 160 represents a computer, workstation, personal digital assistant, wireless device, or other processor used for requesting and receiving content from one or more servers 171, 172, 173 of a server farm 170. Server farm 170 acts as an endpoint for requests for content that are issued by client 160. Alternatively, servers 171, 172, 173 may be considered endpoints.

Network 150 is one or more local networks, wide area networks, or internetworks, such as the global family of internetworks known as the Internet. For clarity, only one client 160 is shown in FIG. 1; however, in a practical embodiment, there may be any number of clients transiently coupled to load balancer 100.

Load balancer 100 controls traffic from such clients that is directed to server 170 and thereby balances the workload of servers 171, 172, 173 in server farm 170. As load balancer 100 receives requests from clients 160 for content that is held in server farm 170, load balancer 100 performs comprehensive resource verification before routing the requests. This ensures that the requests are directed to a selected server 171, 172, 173 that has the best response time and the least current processing load. Client 160 communicates with load balancer 100 over an SSL connection 191.

An administrator 140 is communicatively coupled to load balancer 100, directly or indirectly through one or more networks. Administrator 140 is performs administration tasks on load balancer 100 directly or indirectly through a network management system. Administration tasks may include providing and configuring encryption software, such as providing or defining cipher suites. In this context, "administrator" refers broadly to any system, process, individual, user, etc., that interacts with load balancer 100 for management or administration purposes.

A controller 110 executes in load balancer 100 and is responsible for the configuration of the load balancer. Command Line Interface 111 (CLI) provides a character-based user interface used by administrator 140 for configuring load balancer 100.

Load balancer 100 also comprises an SSL termination module 120 that processes SSL connections. For example, SSL termination module 120 handles establishing and disconnecting SSL connections as well as maintaining information pertinent to the SSL connections. Within SSL termination module 120, Server Selection Service 122 selects a service based on selecting an encryption type or cipher suite that is compatible with both the client 160 and the SSL termination module 120, as described in more detail hereinafter.

Load balancer 100 communicates with server farm 170 over a non-SSL connection 192. Alternatively, connection 192 may use SSL or another form of encryption. For purposes of illustrating a simple example, only one server farm 170 is shown in FIG. 1. However, in a practical embodiment, load balancer 100 may manage the load of any number of server farms.

One or more encryption types or cipher suites are provided and configured on both the SSL termination module 120 and the client 160. In one approach, software at client 160 automatically creates and stores a cipher suite list 161 at the client. For example, commercially available Internet browser software that supports SSL includes a cipher suite list 161. The cipher suite list identifies which cipher suites can be processed by the client 160. An administrator 140 creates and stores a cipher suite list 124 at load balancer 100 that indicates which cipher suites can be processed by the load balancer. The cipher suite lists 124, 161 are prioritized lists of the cipher suites that are available to the client 160 and the Server Selection Service 122. According to another embodiment, the cipher suites are on separate storage devices and are available to the client and/or load balancer.

The administrator also creates and stores a mapping of cipher suite names to services 126. The mapping 126 associates selected cipher suites with services that are available from server farm 170. The mapping 126 is created and stored in the Server Selection Service 122 of SSL termination module 120 through a command line interface 111 (CLI). The mapping 126 is created by examining the cipher suite list 161 and the cipher suite list 124, selecting a cipher suite that is compatible with both client and server, and mapping the selected cipher suite to a service. An example of data that may be stored as mapping 126 is shown in Table 1.

TABLE 1

MAPPING OF CIPHER SUITES TO SERVICES

| Entry | Cipher Suite | Service |
|---|---|---|
| 1 | RSA_WITH_EXPORT_WITH_RC4_40_MD5 | Account Overview |
| 2 | RSA_WITH_RC4_128_MD5 | Modify Account |
| 3 | RSA_WITH_RC4_128_SHA | Modify Account |
| 4 | RSA_EXPORT_WITH_DES40_CBC_SHA | Account Overview |
| 5 | RSA_WITH_DES_EDE_CBC_SHA | Account Overview |
| 6 | RSA_WITH_3DES_EDE_CBC_SHA | Modify Account |
| 7 | DHE_DSS_EXPORT_WITH_DES40_CBC_SHA | Account Overview |
| 8 | DHE_DSS_WITH_DES_CBC_SHA | Account Overview |
| 9 | DHE_DSS_WITH_3DES_EDE_CBC_SHA | Modify Account |
| 10 | DHE_RSA_EXPORT_WITH_DES40_CBC_SHA | Modify Account |
| 11 | DHE_RSA_WITH_DES_CBC_SHA | Account Overview |
| 12 | DHE_RSA_WITH_3DES_EDE_CBC_SHA | Modify Account |
| 13 | DH_anon_EXPORT_WITH_RC4_40_MD5 | Account Overview |
| 14 | DH_anon_WITH_RC4_128_MD5 | Modify Account |
| 15 | DH_anon_EXPORT_WITH_DES40_CBC_SHA | Account Overview |
| 16 | DH_anon_WITH_DES_CBC_SHA | Account Overview |
| 17 | DH_anon_WITH_3DES_EDE_CBC_SHA | Modify Account |

In this example, clients that support cipher suites providing lower-strength encryption are entitled to receive only the Account Overview service, which is provided by one or more servers in a particular server farm. Clients that support cipher suites providing higher-strength encryption are entitled to receive the Modify Account service, which may be provided by a different server farm.

For purposes of illustrating a simple example, only two services are identified in Table 1, and they are identified by a text-based name. In a practical embodiment, there may be any number of services, and the mapping may express the services in terms of a virtual IP address of a server farm associated with the service, a server farm name, or any other convenient identifier.

In one approach, an administrator 140 enters a CLI command; in response, controller 110 interprets the CLI command and passes a request to create or update the mapping 126 to SSL termination module 120. In response, Server Selection Service 122 to maps cipher suite names to services as specified in the CLI command. The mapping of cipher suite names to services 126 is stored in Server Selection Service 122 after an administrator 140 activates the mapping.

When a client 160 requests data from a server in server farm 170, the cipher suite list 161 of client 160 is transmitted to Server Selection Service 122 as part of the SSL handshake phase. Server Selection Service 122 uses the cipher suite lists 124, 161 to make a cipher suite match.

In one embodiment, the first common cipher suite in both lists 124, 161 is designated as the cipher suite match. As part of the SSL handshake phase, client 160 is informed of the cipher suite match. The SSL termination module 120, via the Server Selection Service 122, stores information specifying the cipher suite match throughout the session.

The mapping of cipher suite names to services 126 in the Server Selection Service 122 is used to select a service based on the cipher suite match. In one approach, Server Selection Service 122 looks up the cipher suite match in the mapping 126, and identifies a corresponding service. The service corresponds to a server farm, such as server farm 170, that is capable of providing data at an encryption level associated with the service and appropriate for the cipher suite match.

The load balancer 100 then selects a server in the server farm 170 and redirects one or more content requests to that server. Assume that server 171 is selected. The load balancer 100 redirects a content request from client 160 to server 171. In the data transmission phase, content provided by server 171 is encrypted using a bulk encryption algorithm at SSL termination module and passed, in encrypted form, over network 150 to client 160. The encrypted connection 191 between the client 160 and the SSL termination module 120 can be disconnected while the SSL termination module 120 communicates with a particular server, in server farm 170.

During the data transmission phase, the load balancer 100 can retrieve the requested data and subsequently transmit the data to the client 160 in encrypted form. In these communications, load balancer 100 communicates with server 171 over a non-SSL connection 192. Alternatively, load balancer 100 can instruct the selected server 171 to route the requested data to the client 160; this alternative is appropriate if the selected server has inherent encryption capability.

In this approach, SSL termination module 120 matches a particular server farm to the client based on the level or strength of encryption of which the client is capable, as represented by a cipher suite in cipher suite list 161. However, since the client 160 determines what cipher suites are in the cipher suite list 161, the client has partial control over the level of service it receives.

According to one embodiment, the cipher suite match can be used for future communications between the client 160 and the SSL termination module 120, i.e., in different SSL sessions.

For purposes of illustrating an example, embodiments are described herein with respect to an SSL termination module 120 that is an element of a load balancer 100. However, the approaches described herein are applicable to any other mechanism for implementing the SSL protocol, and use of an SSL termination module within a load balancer is not required. As one alternative, the processes described herein may be implemented in a separate SSL termination device or processor. Further, while cipher suites are principally described, any form of encryption type definition may be used.

Also, for purposes of illustrating an example, embodiments are described herein with respect to use of a CLI and CLI commands to carry out steps or perform various functions. However, embodiments are not limited to use of CLI or any other user interface mechanism. The functions described in conjunction with CLI may be carried out using any other user interface, or may be carried out programmatically without a user interface.

2.0 METHOD FOR PROVIDING DATA BASED ON ENCRYPTION CAPABILITIES

Figure 2:
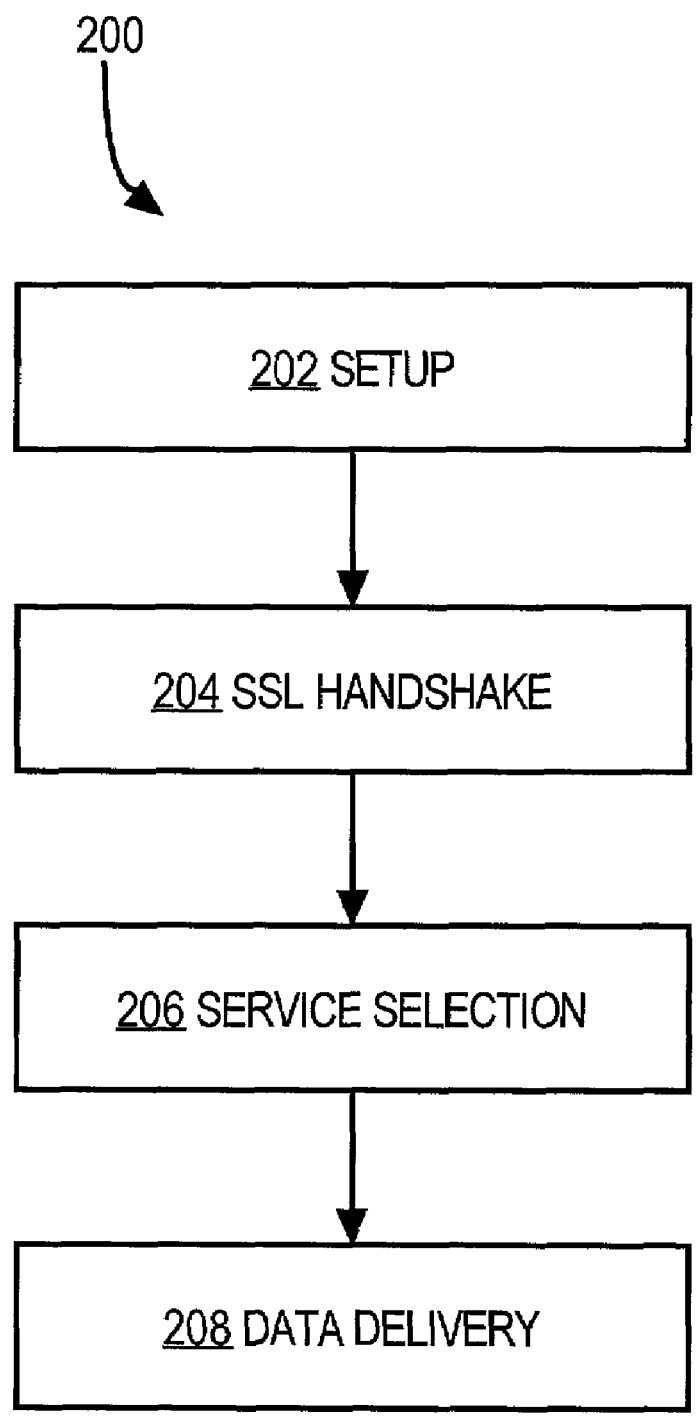
FIG. 2 is a flow diagram illustrating a high level view of four phases of processing.
Figure 3:
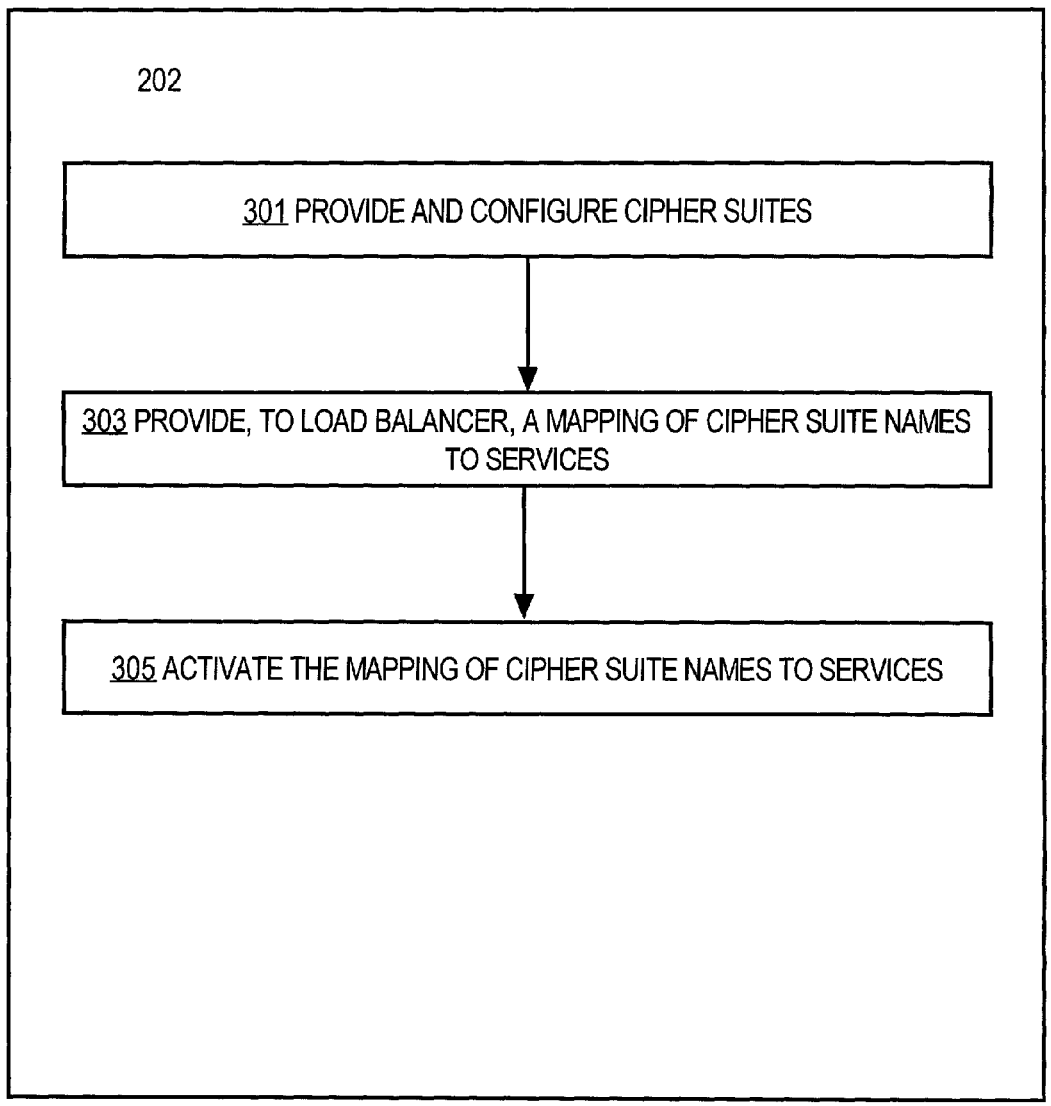
FIG. 3 is a flow diagram that illustrates a setup phase.
Figure 4:
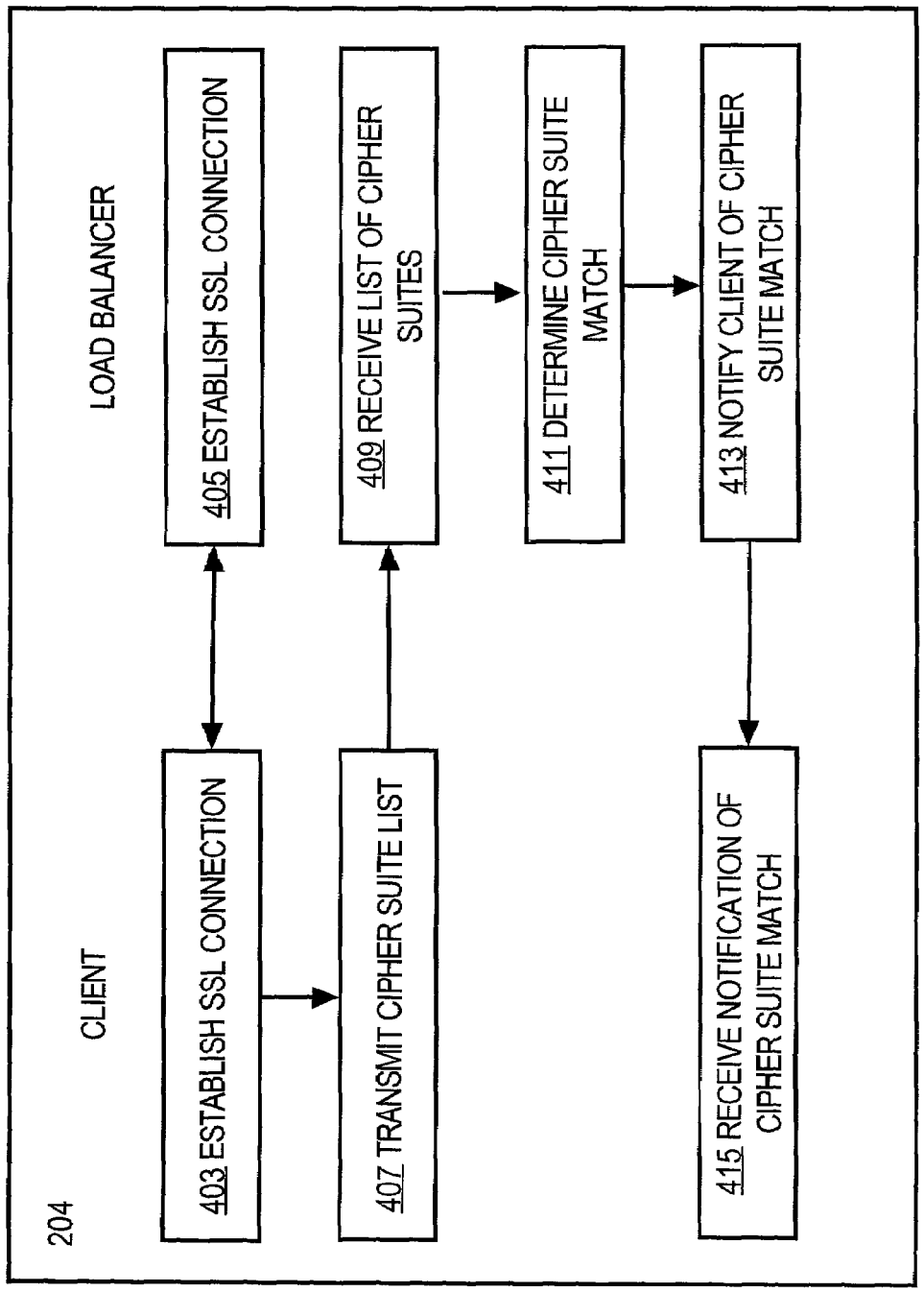
FIG. 4 is a flow diagram that illustrates an SSL handshake phase.
Figure 5:
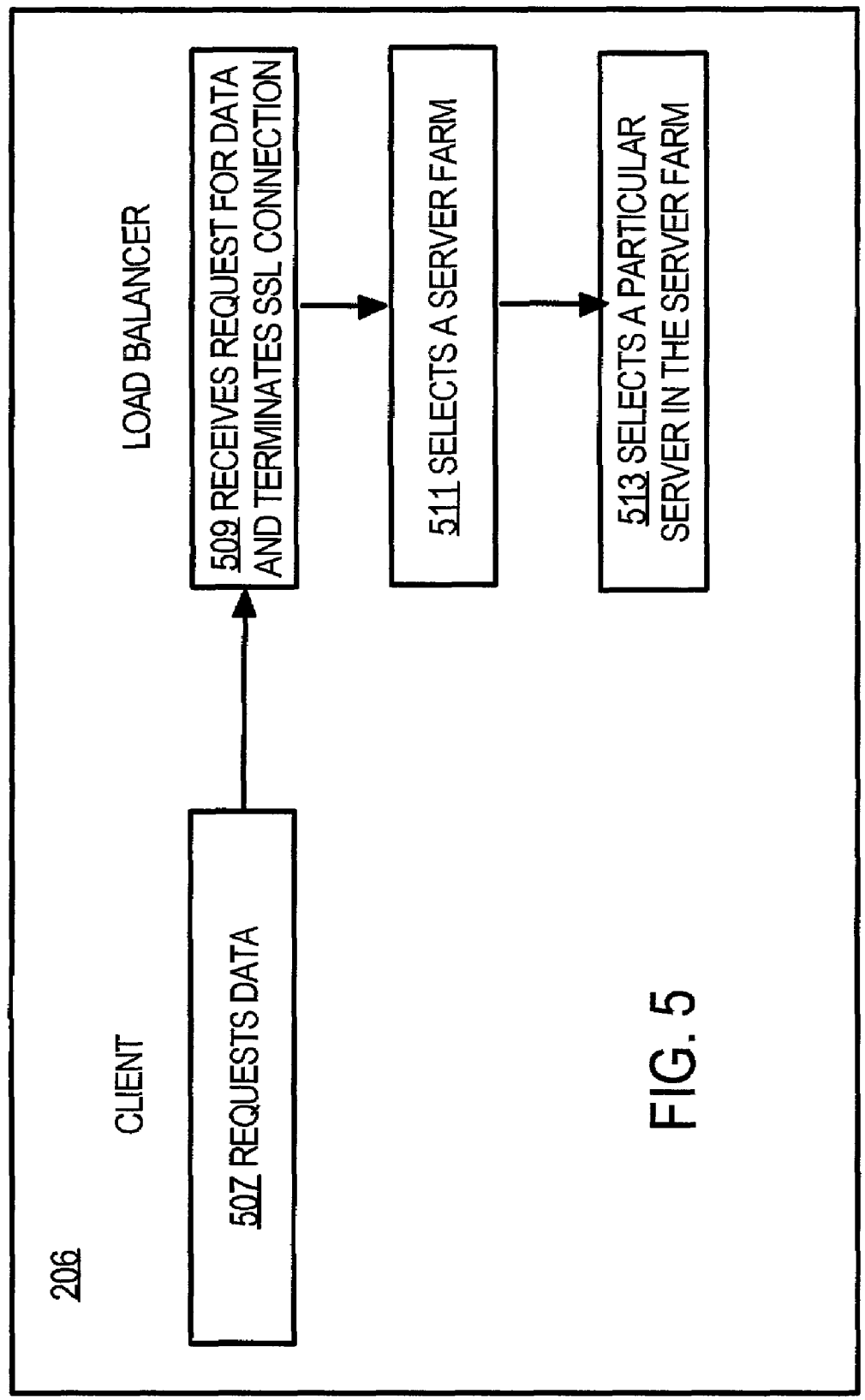
FIG. 5 is a flow diagram that illustrates a service selection phase.
Figure 6:
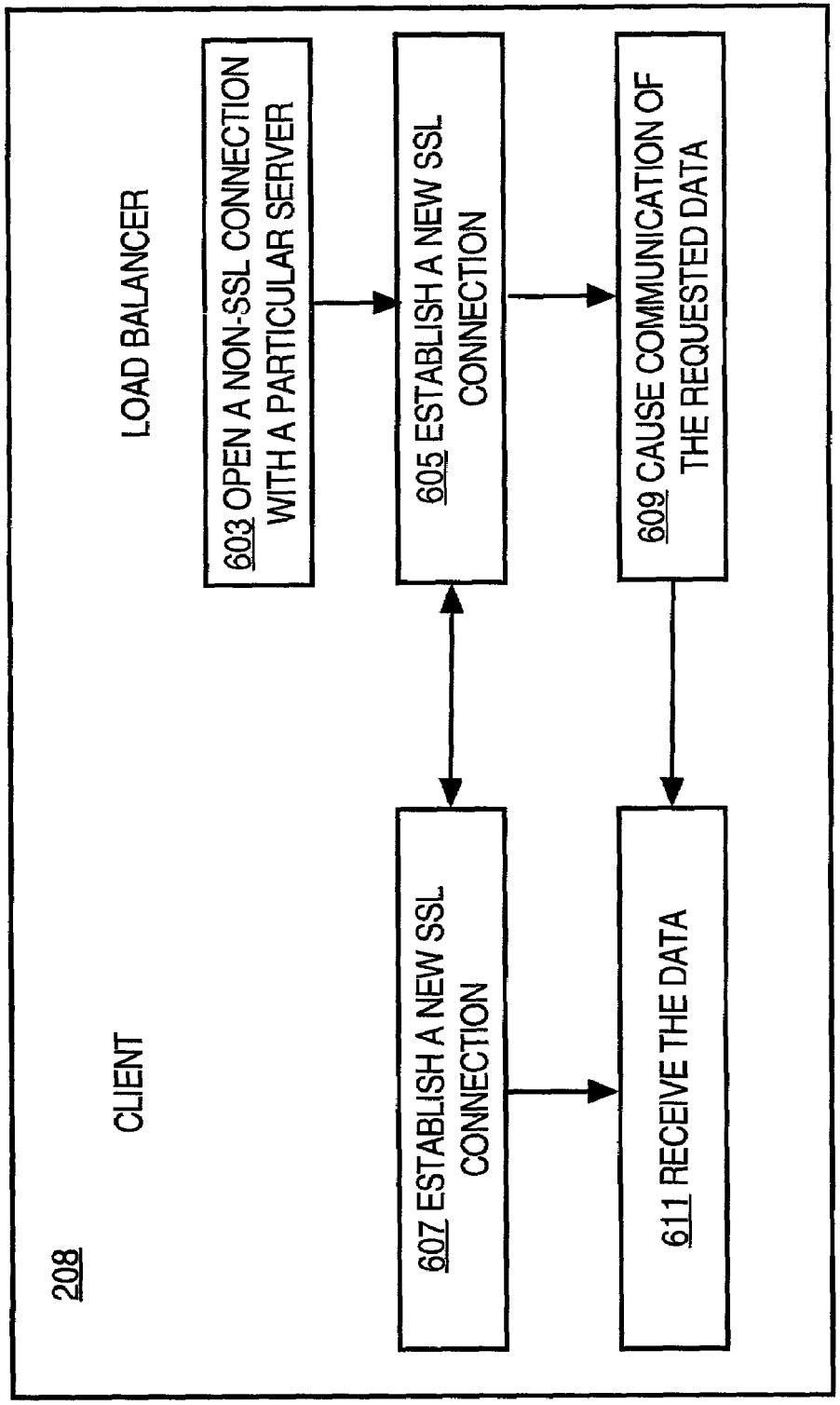
FIG. 6 is a flow diagram that illustrates a data delivery phase.

Details of a method for providing data based on encryption capabilities of a client are now illustrated. FIG. 2 is a flow diagram illustrating a high level view of four phases of processing; FIG. 3 is a flow diagram that illustrates a setup phase; FIG. 4 is a flow diagram that illustrates an SSL handshake phase; FIG. 5 is a flow diagram that illustrates a service selection phase; and FIG. 6 is a flow diagram that illustrates a data delivery phase.

Referring first to FIG. 2, a process of providing data based on encryption capabilities includes four phases comprising a setup phase 202, SSL handshake phase 204, service selection phase 206, and data delivery phase 208. In the setup phase 202, cipher suites lists are provided, configured, and activated. In the SSL handshake phase 204, an SSL connection is established, cipher suite lists are exchanged, and a cipher suite match is determined. The cipher suite match determines the encryption level used for the current session. In the service selection phase 206, data is requested and a server is selected, based on the cipher suite match, to provide data at a level of encryption appropriate for the cipher suite match. In the data delivery phase 208, the data is transmitted to the client using an encryption level associated with the cipher suite match.

FIG. 3 is a flow diagram of the setup phase. In step 301, the cipher suites are provided and configured on an SSL termination module or device and the client. For example, a user installs and configures cipher suites on client 160, and an administrator installs and configures cipher suites on load balancer 100. Alternatively, software installed at client 160 may automatically create and store a cipher suite list in the client or in association with such software.

In one embodiment, step 301 involves configuring load balancer 100 with a list of available cipher suites using one or more CLI commands. In this approach, for each available SSL version, load balancer 100 stores a distinct list of supported cipher suites. Available cipher suites are associated with SSL proxy list elements. A proxy list comprises one or more elements that each have their own cipher suite associations. The administrator is given the ability to configure the available cipher suites for each of a plurality of SSL proxy list elements by using the following commands. First, an element is created using the commands:

(config)# Ssl-proxy-list abc
(ssl-proxy-list[abc])# element 1

Then a cipher suite may be configured with the command:

(ssl-proxy-list[abc])# element 1 cipher <name> <server ip> <server port> [weight <1–10>]

where <server ip> is the IP address of the SSL server, and <port> is the port number of the SSL server that is used for SSL connections. Weight is an optional parameter to assign a priority to the cipher suite with 10 being the highest. By default all configured cipher suites have a weight of 1. When negotiating which cipher suite to use, the SSL Termination Module selects from the client list based on the cipher suite configured with the highest weight. Service is another optional parameter, which allows the administrator to send certain cipher suites to services other than the one configured for the rule. If no service is entered, then the service configured for the rule is used. Each element also allows configuration of the other pertinent information including certificates and keys.

To remove one or more of the configured cipher suites for a particular rule, according to one embodiment, the administrator enters the CLI command:

(ssl-proxy-list[abc])# no element 1 cipher <name>

Where name is the name of the suite to remove.

After the lists are configured, they may be added to any SSL termination module 120 that is defined in the configuration. Each module 120 is configured as a service on the load balancer 100. The following commands present an example of adding a list to a service:

(config)# service fortune
(config-service[fortune])# add ssl-proxy-list <ssl-proxy-list name> where "fortune" is a keyword referring to SSL module 120. To remove the ssl-proxy-list, the following commands may be used:

(config)# service fortune
(config-service[fortune])# remove ssl-proxy-list <ssl-proxy-list name>

According to one embodiment, the available cipher suites for SSL termination module 120 are selected from those listed in Table 2. According to one embodiment, the administrator may select, and SSL termination module 120 and client 160 may use, any of the cipher suites defined for SSL version 3.0 and TLS version 1.0.

TABLE 2

| CIPHER SUITES |
|---|
| RSA_WITH_EXPORT_WITH_RC4_40_MD5 |
| RSA_WITH_RC4_128_MD5 |
| RSA_WITH_RC4_128 SHA |
| RSA_EXPORT_WITH_DES40_CBC_SHA |
| RSA_WITH_DES_EDE_CBC_SHA |
| RSA_WITH_3DES_EDE_CBC_SHA |
| DHE_DSS_EXPORT_WITH_DES40_CBC_SHA |
| DHE_DSS_WITH_DES_CBC_SHA |
| DHE_DSS WITH_3DES_EDE_CBC_SHA |
| DHE_RSA_EXPORT_WITH_DES40_CBC_SHA |
| DHE_RSA_WITH_DES_CBC_SHA |
| DHE_RSA_WITH_3DES_EDE_CBC_SHA |
| DH_anon_EXPORT_WITH_RC4_40_MD5 |
| DH_anon_WITH_RC4_128_MD5 |
| DH_anon_EXPORT_WITH_DES40_CBC_SHA |
| DH_anon_WITH_DES_CBC_SHA |
| DH_anon_WITH_3DES_EDE_CBC_SHA |

In step 302, an administrator creates a mapping of cipher suite names to services. For example, an administrator 140 uses CLI 111 to enter a mapping of cipher suite names to services into the load balancer 100. The mapping is an ordered list of the cipher suites that are provided and configured on the load balancer, in association with services.

In one embodiment, the cipher suites are ordered by assigning weight values to each cipher suite. Use of a weight value is optional. If a weight value is not provided, then the cipher suite mapping is ordered by the date and time at which each entry in the mapping was created.

Further, the service value in the mapping is optional. If the service name is not specified, then a default destination is used.

In step 305, the mapping of cipher suite names to services is activated. For example, an administrator 140 enters an activate command through CLI 111. According to one embodiment, in response to activation, the mapping of cipher suite names to services is checked for errors, e.g., by Server Selection Service 122. Controller 110 has a communication interface to the SSL termination module. Using the communication interface, the SSL termination module may report errors to controller 110 that subsequently are reported to administrator 140. If there are errors, the mapping of cipher suite names to services is not activated, and the administrator 140 is informed of the error through an appropriate message. This gives the administrator a chance to correct the errors. If there are no errors, the mapping of cipher suite names to services is stored in the Server Selection Service 122 of the SSL termination module 120.

FIG. 4 is a flow diagram of the SSL handshake phase. In step 403 and step 405, an SSL connection is established between the client and the load balancer. For example, in the arrangement of FIG. 1, client 160 and load balancer 100 establish an SSL connection 191.

In step 407, the client transmits its cipher suite list to the load balancer. For example, client 160 transmits cipher suite list 161 to the load balancer 100 over connection 191.

In step 409, the load balancer receives the cipher suite list from the client. For example, load balancer 100 receives the cipher suite list 161 of client 160. In step 411, a cipher suite match is determined. For example, Server Selection Service 122 uses the cipher suite list 161 in conjunction with the mapping of cipher suite names to services 126 to determine a cipher suite match. According to one embodiment, Server Selection Service 122 selects the first common cipher suite between cipher suite list 161 and mapping 126 as the cipher suite match.

In step 413, the load balancer notifies the client of the cipher suite match. In step 415 the client receives notification of the cipher suite match. For example, load balancer 100 notifies client 160 of the cipher suite match, and the client 160 receives the notification of the cipher suite match.

FIG. 5 is a flow diagram of the service selection phase. In step 507, the client requests data, content from a content server that is in a server farm, or a particular service. For example, assume that client 160 requests bank account information over connection 191.

In step 509, the load balancer receives the client request for data, and the SSL connection is terminated. For example, load balancer 100 receives the client 160's request for bank account information over SSL connection 191, and the SSL termination module 120 terminates the SSL connection 191. However, at this point both the client 160 and the Server Selection Service 122 have knowledge of the cipher suite match, so that a new SSL connection 191 can be established without repeating the handshake phase.

In step 511, the load balancer selects a service that can respond to the client request, based on the cipher name in the cipher suite match. For example, the Server Selection Service 122 determines that the cipher suite match is for a cipher suite providing high-strength encryption. Implicitly, client 160 is authorized to modify bank account information. Accordingly, Server Selection Service 122 maps the requested service and cipher suite match in the mapping 126 to a server farm 170 that is capable of providing the service.

In step 513, the load balancer selects a particular server in the server farm to communicate the requested data to the client. For example, load balancer 100 selects a server 171 in server farm 170. The decision of step 513 may be carried out using conventional server selection techniques that are used by presently known load balancers.

FIG. 6 is a flow diagram of the data delivery phase according to one embodiment. In step 603, a non-SSL connection is established with the selected server in the server farm. For example, load balancer 100 establishes an HTTP connection 192 with server 171. A virtual IP (VIP) address of server farm 170 can be used to open the non-SSL connection. According to one embodiment, the load balancer 100 retrieves the requested data from the selected server 171. According to another embodiment, the load balancer 100 instructs the selected server 171 to provide the requested data to the client 160.

In step 605 and step 607, a new SSL connection is established with the client. In step 609 the requested data is transmitted to the client. For example, a new SSL connection 191 is established between the load balancer 100 and the client 160, or between the server 171 and the client 160. The new SSL connection uses the encryption capabilities associated with the cipher suite match.

In step 611, the client receives the requested data in encrypted form as specified by the cipher suite match. For example, client 160 receives the data either directly from server 171 or indirectly from the load balancer 100.

As an alternative to the process shown in FIG. 6, the client may make a clear connection to the load balancer and the load balancer may make an SSL connection to the server. This arrangement is SSL origination, i.e., the opposite of SSL termination, in which the client is located on an inside network and the servers are located on the outside network. Based on the strength of the cipher suite that is selected, the load balancer may decide to end the server connection and not send any data. Then it might try other servers to look for a better suite.

According to one specific embodiment, one or more load balancers are implemented as part of a content services switch. An example of a commercially available product that may be used as a platform for an implementation is the Cisco CSS 11800 content services switch. In this embodiment, controller 110 is a System Control Module of the content services switch, and the SSL termination module 120 is a blade in the chassis of the content services switch. According to one embodiment, the processing described herein for SSL termination module 120 and Server Selection Service 122 is implemented as firmware.

According to another embodiment, a security protocol other than SSL is used for connection 191; examples of appropriate security protocols are PPTP, IPSec, and Secure Shell or SSH. In an SSH implementation, the authentication method and the Cipher Type value determine the overall strength or quality of encryption that is used in an SSH connection. Accordingly, the authentication method and the Cipher Type value are used in the mapping 126, and as a basis for determining which service receives a client request.

3.0 IMPLEMENTATION MECHANISMS—HARDWARE OVERVIEW

Figure 7:
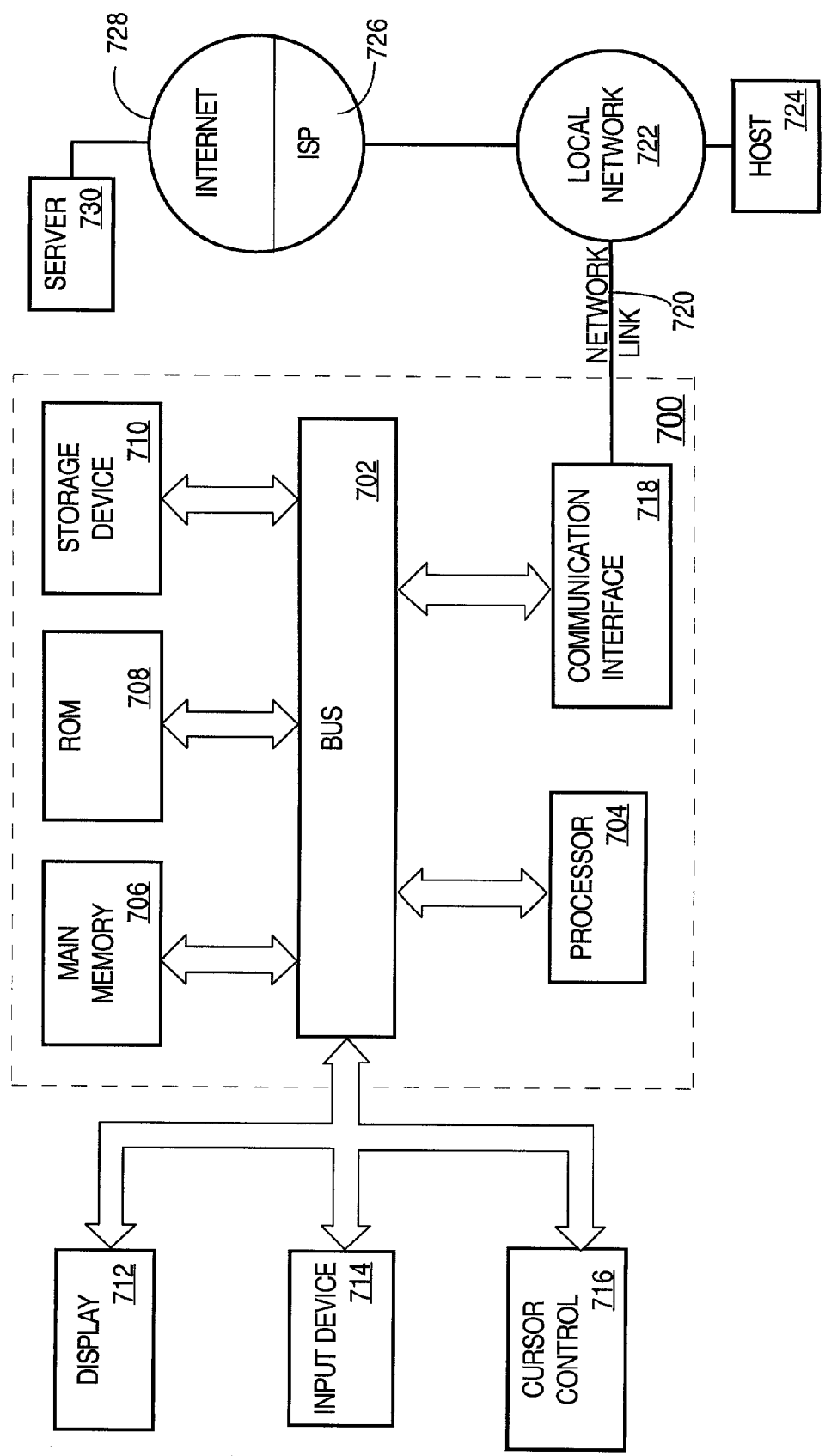
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for providing data from a service to a client based on encryption capabilities of the client. According to one embodiment of the invention, providing data from a service to a client based on encryption capabilities of the client are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for providing data from a service to a client based on encryption capabilities of the client as described herein.

The received code may be executed by processor 704 as it is received, and/or stored in storage device 710, or other non-volatile storage for later execution. In this manner, computer system 700 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing data from a service to a client over a telecommunication network based on encryption capabilities of the client, the method comprising the computer-implemented steps of:
    at an intermediate server, creating and storing a mapping that associates encryption types to a plurality of available online services, wherein each of the plurality of online services is provided by one or more of a plurality of servers;
    wherein the intermediate server is coupled to the client and to the plurality of servers;
    at the intermediate server, receiving from the client a request for data and a list of encryption types representing encryption capabilities that are available at the client;
    determining an encryption type match by matching the list of encryption types received from the client to the mapping of encryption types to the plurality of online services;
    selecting, from the plurality of online services, an online service that can provide the data to the client based on the encryption type match, wherein selecting the online service comprises selecting a particular server from the plurality of servers that provides the online service; and
    causing communication of the data from the selected online service to the client.

2. A method as recited in claim 1, further comprising the step of establishing a secure connection with the client, and wherein the receiving step is carried out as part of the establishing step.

3. A method as recited in claim 1, further comprising the step of establishing a secure connection with the client, and wherein the receiving step is carried out as part of the establishing step, wherein the secure connection is established using a security protocol selected from among the set consisting of SSL, PPTP, SSH, and IPSec.

4. A method as recited in claim 1, further comprising the step of establishing a secure connection with the client, and wherein the receiving step is carried out as part of the establishing step, wherein the step of establishing the secure connection further comprises the step of establishing the secure connection with the client using a cipher suite match.

5. The method as recited in claim 1, further comprising the step of establishing a secure connection with the client, and wherein the receiving step is carried out as part of the establishing step, and further comprising the step of disconnecting the secure connection and reestablishing the secure connection using a cipher suite match.

6. The method as recited in claim 1, wherein the mapping of encryption types to services is an ordered mapping of cipher suites to services.

7. The method as recited in claim 1, further comprising the steps of receiving a weight value for one or more of the encryption types, and ordering the mapping of encryption types to services based on the received weight values.

8. A method as recited in claim 1, wherein the encryption type is a cipher suite match.

9. A method as recited in claim 1, wherein the step of selecting an online service that can provide the data to the client based the encryption type match further comprises the step of
    selecting a server farm based on the online service, wherein the server farm includes the plurality of servers.

10. A method as recited in claim 1, wherein the step of causing communication further comprises the step of establishing a connection with a non-encrypted protocol for use in communicating a request to the selected service to cause communication of the data from the selected service to the client.

11. A method of providing data from a service to a client based on encryption capabilities of the client, the method comprising the computer-implemented steps of:
    at an intermediate server, receiving an ordered mapping of cipher suite names to a plurality of services, wherein each of the plurality of services is provided by one or more of a plurality of servers in a server farm;
    wherein the intermediate server is coupled to the client and to the plurality of servers in the server farm;
    at the intermediate server, receiving from the client a request for data and an ordered list of cipher suites;
    determining a cipher suite match by selecting a first common cipher suite in the ordered list of cipher suites and the ordered mapping of cipher suite names to services;
    transmitting the cipher suite match to the client;
    selecting, from the plurality of services, the service that is associated with the cipher suite match in the ordered mapping;
    selecting the server farm based on the service;
    selecting a particular server from the plurality of servers in the server farm to provide the data to the client, wherein the particular server provides the service; and
    transmitting the data to the client.

12. A method as recited in claim 1, wherein the mapping of encryption types to services is stored in an SSL termination module.

13. A method of providing data associated with a service to a client over a telecommunication network based on SSL encryption capabilities of the client, the method comprising the computer-implemented steps of:
    creating and storing, at an SSL termination device, a mapping that associates cipher suites that are supported by the SSL termination device with a plurality of online services that are accessible through the SSL termination device, wherein each of the plurality of services is provided by one or more of a plurality of servers;
    wherein the SSL termination device is coupled to the client and to the plurality of servers;
    receiving from the client as part of an SSL handshake phase message, a request for data and a list of cipher suites that are available at the client;
    matching the cipher suite list received from the client to the mapping to result in identifying at least one cipher suite in common between the cipher suite list and the mapping;

based at least on the mapping, selecting an online service from the plurality of online services that corresponds to the cipher suite in common, wherein selecting the online service comprises selecting a particular server from the plurality of servers that provides the online service; and causing communication of the data from the selected online service to the client over an SSL connection using encryption parameters as defined in the cipher suite in common.

14. A computer-readable medium carrying one or more sequences of instructions for providing data from a service to a client based on encryption capabilities of the client, which instructions, when executed by one or more processors, cause the one or more processors to carry out the steps of:

at an intermediate server, creating and storing a mapping that associates encryption types to a plurality of available online services, wherein each of the plurality of online services is provided by one or more of a plurality of servers;

wherein the intermediate server is coupled to the client and to the plurality of servers;

at the intermediate server, receiving from the client a request for data and a list of encryption types representing encryption capabilities that are available at the client;

determining an encryption type match by matching the list of encryption types received from the client to the mapping of encryption types to the plurality of online services;

selecting, from the plurality of online services, an online service that can provide the data to the client based on the encryption type match, wherein selecting the online service comprises selecting a particular server from the plurality of servers that provides the online service; and causing communication of the data from the selected online service to the client.

15. An apparatus for providing data from a service to a client based on encryption capabilities of the client, comprising:

means for executing an intermediate server that is operable to connect to the client and to a plurality of servers;

means for creating and storing, at the intermediate server, a mapping that associates encryption types to a plurality of available online services, wherein each of the plurality of online services is provided by one or more of the plurality of servers;

means for receiving from the client a request for data and a list of encryption types representing encryption capabilities that are available at the client;

means for determining an encryption type match by matching the list of encryption types received from the client to the mapping of encryption types to the plurality of online services;

means for selecting, from the plurality of online services, an online service that can provide the data to the client based on the encryption type match, wherein the means for selecting the online service comprise means for selecting a particular server from the plurality of servers that provides the online service; and means for causing communication of the data from the selected service to the client.

16. An apparatus for providing data from a service to a client based on encryption capabilities of the client, comprising:

a network interface that is coupled to a data network for receiving one or more packet flows therefrom;

a processor;

an intermediate server which, when executed by the processor, is operable to connect to the client and to a plurality of servers; and one or more stored sequences of instructions which, when executed by the processor, cause the processor to carry out the steps of:

creating and storing, at the intermediate server, a mapping that associates encryption types to a plurality of available online services, wherein each of the plurality of online services is provided by one or more of the plurality of servers;

receiving from the client a request for data and an ordered list of encryption types;

determining an encryption type match by matching the list of encryption types received from the client to the mapping of encryption types to the plurality of online services;

determining a particular server from the plurality of servers to retrieve the data based on the encryption type match, wherein the particular server provides the service which is selected from the plurality of online services; and causing communication of the data from the particular server to the client.

17. An apparatus as recited in claim 16, wherein the one or more stored sequences of instructions further comprise instructions which, when executed by the processor, cause the processor to carry out the step of establishing a secure connection with the client, and wherein the receiving step is carried out as part of the establishing step.

18. An apparatus as recited in claim 16, wherein the one or more stored sequences of instructions further comprise instructions which, when executed by the processor, cause the processor to carry out the step of establishing a secure connection with the client, and wherein the receiving step is carried out as part of the establishing step, wherein the secure connection is established using a security protocol selected from among the set consisting of SSL, PPTP, SSH, and IPSec.

19. An apparatus as recited in claim 16, wherein the one or more stored sequences of instructions further comprise instructions which, when executed by the processor, cause the processor to carry out the step of establishing a secure connection with the client, and wherein the receiving step is carried out as part of the establishing step, wherein the step of establishing the secure connection further comprises the step of establishing the secure connection with the client using a cipher suite match.

20. An apparatus as recited in claim 16, wherein the one or more stored sequences of instructions further comprise instructions which, when executed by the processor, cause the processor to carry out the step of establishing a secure connection with the client, and wherein the receiving step is carried out as part of the establishing step, and further comprising the step of disconnecting the secure connection and reestablishing the secure connection using a cipher suite match.

21. An apparatus as recited in claim 16, wherein the mapping of encryption types to services is an ordered mapping of cipher suites to services.

22. An apparatus as recited in claim 16, wherein the one or more stored sequences of instructions further comprise instructions which, when executed by the processor, cause the processor to carry out the steps of receiving a weight value for one or more of the encryption types, and ordering the mapping of encryption types to services based on the received weight values.

23. An apparatus as recited in claim 16, wherein the encryption type is a cipher suite match.

24. An apparatus as recited in claim 16, wherein the instructions that cause the processor to carry out the step of selecting an online service that can provide the data to the client based the encryption type match further comprise instructions which, when executed by the processor, cause the processor to carry out the step of selecting a server farm based on the online service, wherein the server farm includes the plurality of servers.

25. An apparatus as recited in claim 16, wherein the instructions that cause the processor to carry out the step of causing communication further comprise instructions which, when executed by the processor, cause the processor to carry out the step of establishing a connection with a non-encrypted protocol for use in communicating a request to the selected service to cause communication of the data from the selected service to the client.

26. An apparatus as recited in claim 16, further comprising an SSL termination module that is operable to store the mapping of encryption types to services.

27. An apparatus as recited in claim 15, further comprising means for establishing a secure connection with the client, wherein the means for establishing the secure connection include the means for receiving the request from the client.

28. An apparatus as recited in claim 15, further comprising means for establishing a secure connection with the client, wherein the means for establishing the secure connection include the means for receiving the request from the client, wherein the secure connection is established using a security protocol selected from among the set consisting of SSL, PPTP, SSH, and IPSec.

29. An apparatus as recited in claim 15, further comprising means for establishing a secure connection with the client, wherein the means for establishing the secure connection include the means for receiving the request from the client, wherein the means for establishing the secure connection further comprise means for establishing the secure connection with the client using a cipher suite match.

30. An apparatus as recited in claim 15, further comprising:
means for establishing a secure connection with the client, wherein the means for establishing the secure connection include the means for receiving the request from the client; and
means for disconnecting the secure connection and reestablishing the secure connection using a cipher suite match.

31. An apparatus as recited in claim 15, wherein the mapping of encryption types to services is an ordered mapping of cipher suites to services.

32. An apparatus as recited in claim 15, further comprising means for receiving a weight value for one or more of the encryption types and means for ordering the mapping of encryption types to services based on the received weight values.

33. An apparatus as recited in claim 15, wherein the encryption type is a cipher suite match.

34. An apparatus as recited in claim 15, wherein the means for selecting an online service that can provide the data to the client based the encryption type match further comprise means for selecting a server farm based on the online service, wherein the server farm includes the plurality of servers.

35. An apparatus as recited in claim 15, wherein the means for causing communication further comprise means for establishing a connection with a non-encrypted protocol for use in communicating a request to the selected service to cause communication of the data from the selected service to the client.

36. An apparatus as recited in claim 15, further comprising an SSL termination module that is operable to store the mapping of encryption types to services.

37. An apparatus for providing data from a service to a client based on encryption capabilities of the client, comprising:
means for executing an intermediate server that is operable to connect to the client and to a plurality of servers in a server farm;
means for receiving an ordered mapping of cipher suite names to a plurality of services, wherein each of the plurality of services is provided by one or more of the plurality of servers in the server farm;
means for receiving from the client a request for data and an ordered list of cipher suites;
means for determining a cipher suite match by selecting a first common cipher suite in the ordered list of cipher suites and the ordered mapping of cipher suite names to services;
means for transmitting the cipher suite match to the client;
means for selecting, from the plurality of services, the service that is associated with the cipher suite match in the ordered mapping;
means for selecting the server farm based on the service;
means for selecting a particular server from the plurality of servers in the server farm to provide the data to the client, wherein the particular server provides the service; and
means for transmitting the data to the client.

38. An apparatus for providing data from a service to a client over a telecommunication network based on Secure Socket Layer (SSL) encryption capabilities of the client, comprising:
an SSL termination device that is operable to connect to the client and to a plurality of servers;
means for creating and storing, at the SSL termination device, a mapping that associates cipher suites that are supported by the SSL termination device with a plurality of online services that are accessible through the SSL termination device, wherein each of the plurality of services is provided by one or more of the plurality of servers;
means for receiving from the client as part of an SSL handshake phase message, a request for data and a list of cipher suites that are available at the client;
means for matching the cipher suite list received from the client to the mapping to result in identifying at least one cipher suite in common between the cipher suite list and the mapping;
means for selecting, based at least on the mapping, an online service from the plurality of online services that corresponds to the cipher suite in common, wherein the means for selecting the online service comprise means for selecting a particular server from the plurality of servers that provides the online service; and
means for causing communication of the data from the selected online service to the client over an SSL connection using encryption parameters as defined in the cipher suite in common.

* * * * *